(12) United States Patent
Garcia et al.

(10) Patent No.: US 11,050,189 B1
(45) Date of Patent: Jun. 29, 2021

(54) ACCESSORY CONNECTOR FOR A RADIO

(71) Applicant: MOTOROLA SOLUTIONS, INC., Chicago, IL (US)

(72) Inventors: Jorge L Garcia, Plantation, FL (US); Kiok Yung Lee, Nibong Tebal (MY); Chun Wen Ooi, Georgetown (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/862,931

(22) Filed: Apr. 30, 2020

(51) Int. Cl.
| | |
|---|---|
| *H01R 13/627* | (2006.01) |
| *H01R 13/24* | (2006.01) |
| *H01R 13/631* | (2006.01) |
| *H01R 13/639* | (2006.01) |
| *H04B 1/08* | (2006.01) |
| *H01R 13/512* | (2006.01) |
| *H01R 13/52* | (2006.01) |
| *H01R 13/05* | (2006.01) |
| *H01R 13/432* | (2006.01) |
| *H01R 13/621* | (2006.01) |
| *H04B 1/3827* | (2015.01) |

(52) U.S. Cl.
CPC ......... *H01R 13/6278* (2013.01); *H01R 13/05* (2013.01); *H01R 13/2407* (2013.01); *H01R 13/432* (2013.01); *H01R 13/512* (2013.01); *H01R 13/5202* (2013.01); *H01R 13/621* (2013.01); *H01R 13/639* (2013.01); *H01R 13/6315* (2013.01); *H04B 1/088* (2013.01); *H04B 1/3833* (2013.01)

(58) Field of Classification Search
CPC .. H01R 13/629; H01R 13/193; H01R 13/633; H01R 13/71; H01R 13/2421; H01R 13/2428; H01R 13/6215; H01R 13/6395; H01R 13/6278; H01R 13/2407; H01R 13/6315; H01R 13/639; H01R 13/512; H01R 13/5202; H01R 13/05; H01R 13/432; H01R 13/621; H04B 1/088; H04B 1/3833
USPC ......................... 439/341, 180, 700, 359, 362
See application file for complete search history.

(56) References Cited

U.S. PATENT DOCUMENTS

| | | | | |
|---|---|---|---|---|
| 5,057,030 A | * | 10/1991 | Hutson | .............. H01R 13/5202 439/247 |
| 5,666,264 A | * | 9/1997 | Chandler | .................. G06F 1/18 361/679.6 |
| 6,739,891 B2 | * | 5/2004 | Itoh | ..................... H01R 13/6315 439/174 |

(Continued)

FOREIGN PATENT DOCUMENTS

JP 2013144198 A 7/2013

*Primary Examiner* — Gary F Paumen
(74) *Attorney, Agent, or Firm* — Barbara R. Doutre (57) ABSTRACT

An accessory connector (102) and connector system (100) are provided. The accessory connector (102) comprises and edge tongue portion at one end and a thumb screw recess at the opposite end with a floating header therebetween. The edge tongue portion enables pivotal engagement of the accessory connector to a device interface. The floating header (110) has a perimeter alignment wall (112) surrounding a plurality of pogo pins (114) recessed therein. The floating header is movable in planar directions within the accessory connector prior to attachment of the connector to the radio connector interface (154). The x-y moveability allows for fine alignment of the pogo pins to corresponding contacts and loading of the pogo pins to the contacts in a z-direction.

17 Claims, 9 Drawing Sheets

(56) References Cited

U.S. PATENT DOCUMENTS

| | | | | |
|---|---|---|---|---|
| 6,910,911 B2* | 6/2005 | Mellott | ............... | H01R 13/2421 |
| | | | | 439/358 |
| 7,442,060 B2* | 10/2008 | Suwalski | ........... | H01R 13/6275 |
| | | | | 439/180 |
| 7,588,449 B2* | 9/2009 | Takehara | ........... | H01R 13/5219 |
| | | | | 439/247 |
| 8,128,422 B2* | 3/2012 | Mellott | ............... | H01R 13/2421 |
| | | | | 439/180 |
| 8,241,053 B2* | 8/2012 | Slippy | .................. | H02G 15/007 |
| | | | | 439/353 |
| 8,360,795 B2* | 1/2013 | Moore | ............... | H01R 13/6392 |
| | | | | 439/342 |
| 8,469,732 B2* | 6/2013 | Sen | ...................... | H01R 13/639 |
| | | | | 439/347 |
| 8,821,173 B2* | 9/2014 | Carnevali | ............. | G06F 1/1632 |
| | | | | 439/248 |
| 9,300,086 B1* | 3/2016 | Qu | ...................... | H01R 13/6392 |
| 9,429,994 B1* | 8/2016 | Vier | ...................... | G06F 1/1656 |
| 2010/0009558 A1* | 1/2010 | Lin | ...................... | H01L 23/4093 |
| | | | | 439/73 |
| 2015/0340806 A1* | 11/2015 | Ilkhanov | ............ | H01R 13/5219 |
| | | | | 439/278 |

\* cited by examiner

ACCESSORY CONNECTOR FOR A RADIO

FIELD OF THE INVENTION

The present invention relates generally to accessory connectors and accessory connector systems and more particularly to an enhanced interface alignment header for a connector to interface with a portable radio.

BACKGROUND

Accessory connectors are often used in conjunction with portable communication devices, such as portable two-way radios and the like. There is a strong desire to decrease the size of accessory connectors such as through the use of smaller pins and finer pitch spacing between contact pins. The challenges involved in designing smaller connectors include achieving proper interface alignment when the accessory is connected to the portable radio, as well as preventing pin damage to the accessory connector when the connector is not attached to the radio. A smaller sized connector, with improved interface alignment that better protects contact pins from damage is thus highly desirable.

Accordingly, there is a need for an improved accessory connector for a portable radio

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in apparatus components related to a connector system and accessory connector for a portable radio. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the elements.

Figure 1:
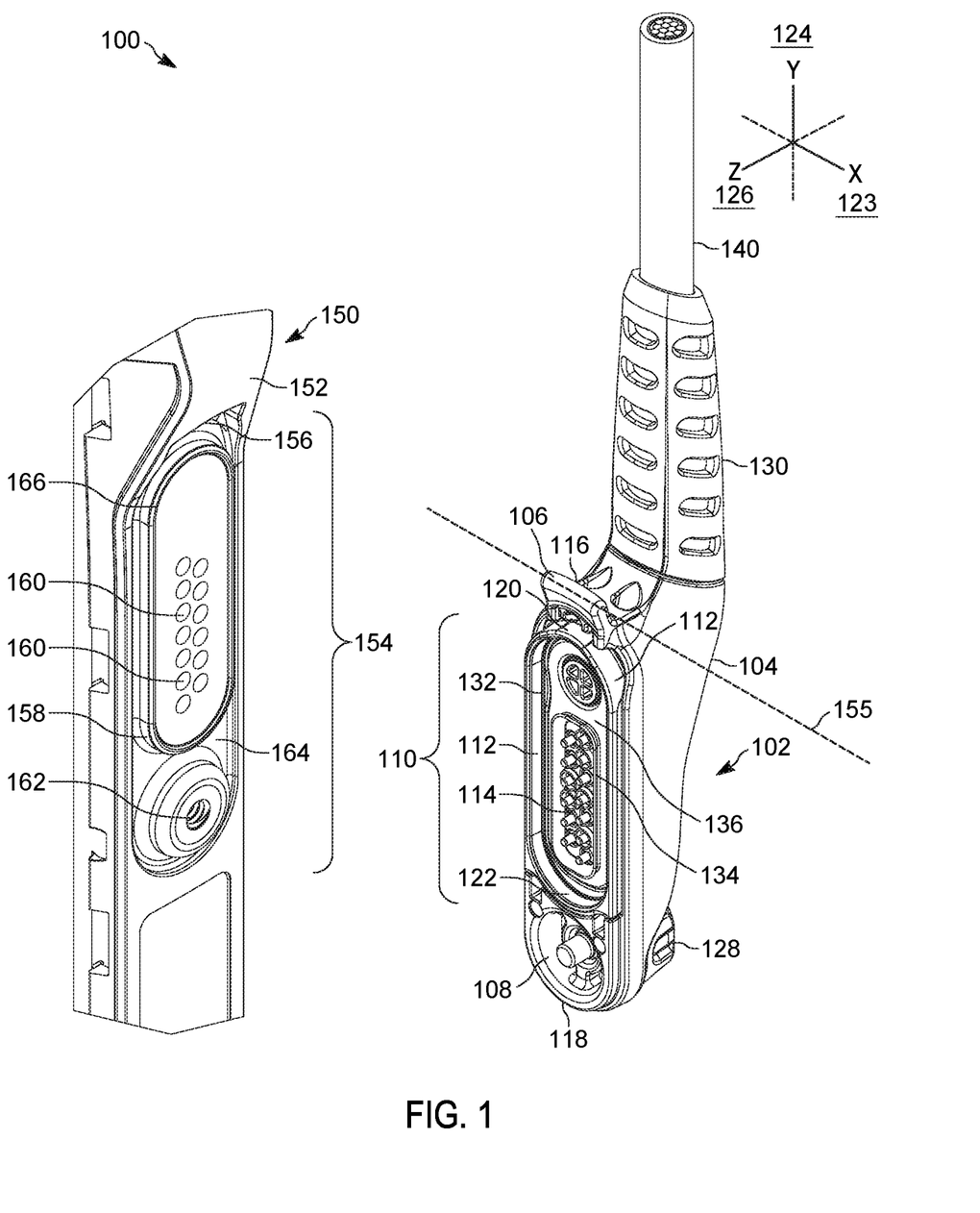
FIG. 1 is a connector system in accordance with the various embodiments.

FIG. 1 is a connector system 100 formed in accordance with the various embodiments. Connector system 100 comprises an accessory connector 102 for coupling a remote accessory, such as an earpiece, remote speaker-microphone, remote data device, wireless dongle or the like, to a portable radio 150 or other portable electronic device. A strain relief 130 and cable 140 known in the art can be used to interconnect the accessory connector 102 to the remote accessory. Accessory connector 102, as will be described herein, advantageously provides a floating header 110 for alignment and a mechanism for mounting and unmounting the accessory connector to and from a connector interface of the portable radio 150 in accordance with the various embodiments.

In accordance with the embodiments, the accessory connector 102 comprises a connector housing 104 having an edge tongue portion 106 extending therefrom, the edge tongue portion being located at a first, upper end 116 of the connector housing 104. The accessory connector 102 further comprises a screw mount recess 108 for receiving a thumb screw 128, the screw mount recess being located at a second, lower end 118 of the connector housing 104.

In accordance with the embodiments, the accessory connector 102 further comprises a floating header 110 formed of a perimeter alignment wall 112 surrounding a plurality of pogo pins 114. The floating header 110 is located between the edge tongue portion 106 and the screw mount recess 108. The perimeter alignment wall 112 has an upper end 120 and a lower end 122. The upper end 120 of the perimeter alignment wall 112 is adjacent to the edge tongue portion 106. The lower end 122 of the perimeter alignment wall 112 is adjacent to the screw mount recess 108. In accordance with the embodiments, the connector housing 104 with edge tongue portion 106 and screw mount recess 108 is formed as a single, unitarily molded plastic piece part. Various plastics, resins or other materials suitable for injection-molding processing may be used. The floating header's perimeter alignment wall 112 is formed of another plastic piece part to which the pogo pins 114 are mounted, thereby reducing alignment tolerances.

The connector housing 104 extends along a longitudinal axis between the first upper end 116 and second lower end 118, running parallel to y-axis 124. In accordance with the embodiments, the floating header 110, being formed of the perimeter alignment wall 112 surrounding the plurality of pogo pins 114, is advantageously movable in x-y planar directions 123, 124 relative to z-loading engagement features, wherein the z-loading engagement features are provided by the edge tongue portion 106 and screw mount recess 108 of the connector housing 104. For the purposes of defining direction, z-axis 126 is the direction of pogo pin 114 engagement. The x-axis 123 is parallel with an axis of rotation 155 about the tongue 106 onto radio connector interface 154. The y-axis 124 is parallel to the longitudinal axis of the connector housing 104 and orthogonal to directions z and x.

The floating header 110 further comprises a lip seal 134 surrounding the pogo pins 114, the lip seal being formed as part of a seal membrane located on the face of the floating header 110. The seal membrane 136 with lip seal 134 provides sealing to the radio when the accessory connector 102 is attached to the portable radio 150.

In accordance with some embodiments, the floating header 110 further comprises a chamfered edge 132 formed along an interior base of the perimeter alignment wall 112, also referred to as header chamfer 132. The chamfered edge 132 provides lead-in for forward loading the connector to the radio interface 154. As the accessory connector 102 is rotated in to the radio housing 152, the header chamfer 132 provides lead-in to locate and align the perimeter alignment wall 112 to a corresponding radio interface chamfer 166 formed on a pedestal feature 158 of the portable radio 150. The depth of header chamfer 132 advantageously allows for full x-y alignment prior to the pogo pins 114 loading to radio contacts 160 in the forward, z-direction 126. Excessive side loading of pogo pins 114 (dragging in x-y planar directions) is avoided which could otherwise damage pogo-pins during long term use.

Referring now to the partial view of the portable radio 150, there is shown a radio housing 152 having a connector interface 154, such as a radio side connector interface. In accordance with the embodiments, and as will also be shown in further views, the connector interface 154 comprises a slot 156 geometrically configured for pivotally receiving the edge tongue portion 106 of the accessory connector 102. The connector interface 154 of the radio further comprises a pedestal feature 158 located adjacent to the slot 156, the pedestal feature having contacts 160 disposed thereon for mating with the plurality of pogo pins 114 of the accessory connector 102. The radio housing 152 forms a recess 164 around the connector interface 154. As will be shown and described in subsequent views, pivotal engagement of the edge tongue portion 106 of the connector housing 104 within the slot 156 causes engagement of the perimeter alignment wall 112 about the pedestal feature 158. The pivotal engagement enables mating of the pogo pins 114 to the contacts 160 in the z-direction 126, relative to the edge tongue portion 106 and screw mount recess 108. The edge tongue portion 106 and screw mount recess 108 control final z location of accessory connector. The thumb screw 128 loads the screw mount recess 108 against the threaded receptacle 162 on radio side in the z direction. The accessory connector 102 is secured to the connector interface 154 of the radio, in the z-direction 126, at the second lower end 118 of the connector housing 104, via a thumb screw 128 inserted through the screw mount recess 108 into a threaded receptacle 162 of the connector interface 154. The recess 164 of the radio housing 152 provides an area against which to load the accessory connector 102 as the thumb screw 128 is tightened into the threaded receptacle 162, thereby aligning the accessory connector in the z-direction at the thumb-screw area.

The accessory connector 102 is thus mounted and retained via the edge tongue portion 106 within slot 156 and the screw mount. The perimeter alignment wall 112 of the floating header 110 of accessory connector 102 surrounds the pedestal feature 158 of the radio connector interface 154 thereby providing fine alignment of the of the pogo pins 114 to the contacts 160.

The connector housing 104 of the accessory connector 102 provides the rough alignment as the edge tongue portion 106 rotates the perimeter alignment wall 112 on to radio pedestal feature 158. The x-y planar moveability of the perimeter alignment wall 112 of the floating header 110 advantageously enables the connector to more precisely align to the radio pedestal feature 158. The accessory connector's floating header 110 finely aligns the pogo pins 114 with the radio contacts 160. Only a very small planar float, on the order 0.2 mm in x-y planar directions (overall total planar float of 0.4 mm), is utilized to achieve this fine alignment.

Figure 2:
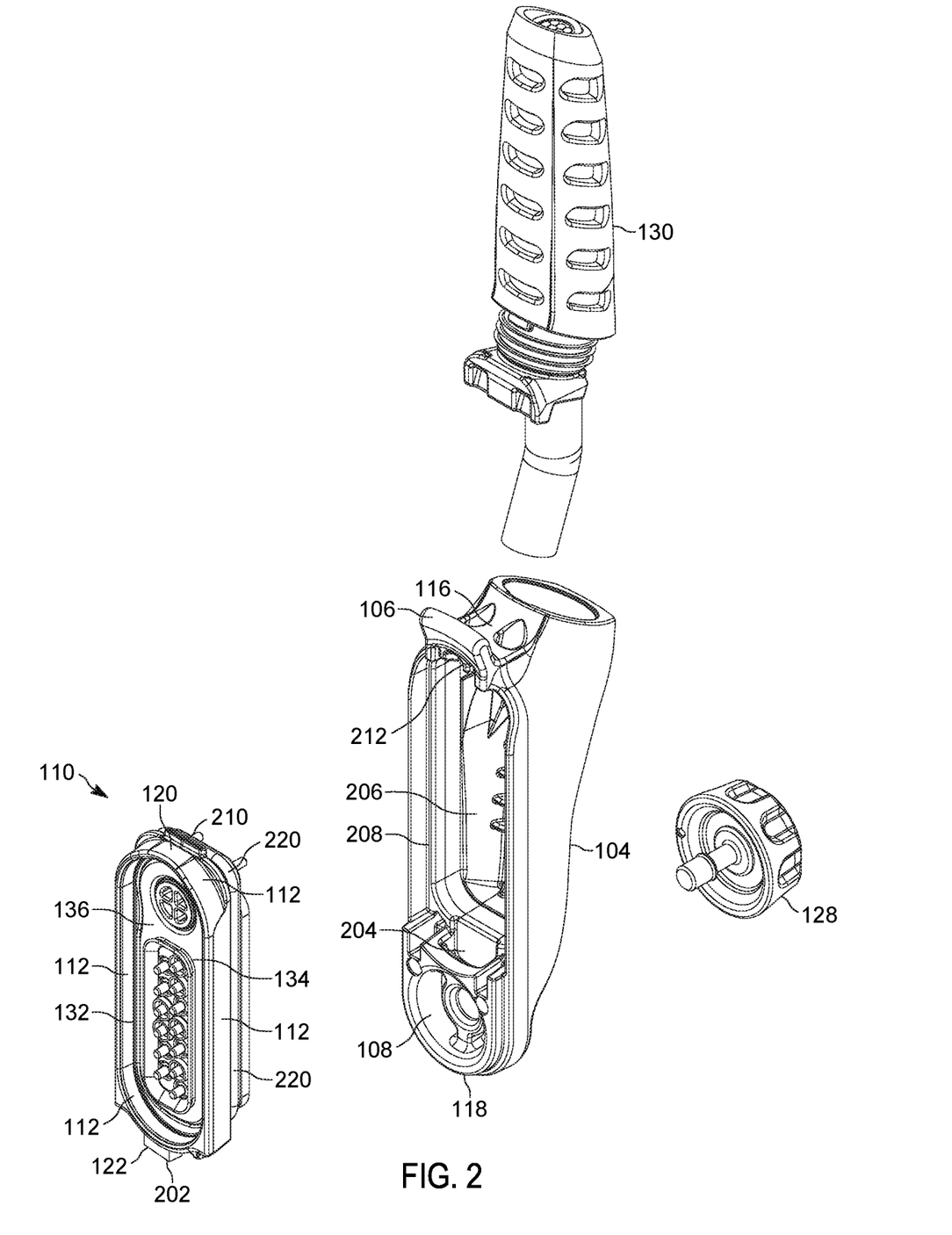
FIG. 2 is an exploded view of the connector system of FIG. 1 in accordance with the various embodiments.

FIG. 2 is an exploded view of the accessory connector 102 of FIG. 1 in accordance with the various embodiments. In this view, connector housing 104 is shown separated from floating header 110, thumb screw 128, and strain relief 130. This view shows the floating header 110 with perimeter alignment wall 112 surrounding pogo pins 114. The lower end 122 of the perimeter alignment wall 112 has a first tab 202 extending therefrom for engaging the floating header 110 into a corresponding retention feature 204 located adjacent to the screw mount recess 108 of the connector housing 104. The floating header 110 is received within an aperture 206 and seated upon an interior ledge 208 of the connector housing 104. The upper end 120 of the perimeter alignment wall 112 has a second tab 210 extending therefrom for snap fitting the floating header 110 into a corresponding retention feature 212 located adjacent to edge tongue portion 106 of the connector housing 104. The floating header 110 is received within the aperture 206, seated upon the interior ledge 208, and snap fit into place via the second tab 210. In accordance with the embodiments, floating header 110 is floated in the connector housing 104 after being snapped into it. A perimeter o-ring seal 220 is coupled around the floating header 110 enabling the header to float, within a purposeful gap (shown later), once snap fit within the connector housing 104. The floating header's perimeter o-ring seal 220 provides x-y compliance which re-centers the header when the accessory connector 102 is not attached to the radio of FIG. 1. Additionally, the perimeter o-ring seal 220 provides protection against water intrusion into the accessory connector 102, when not attached to the radio.

Figure 3A:
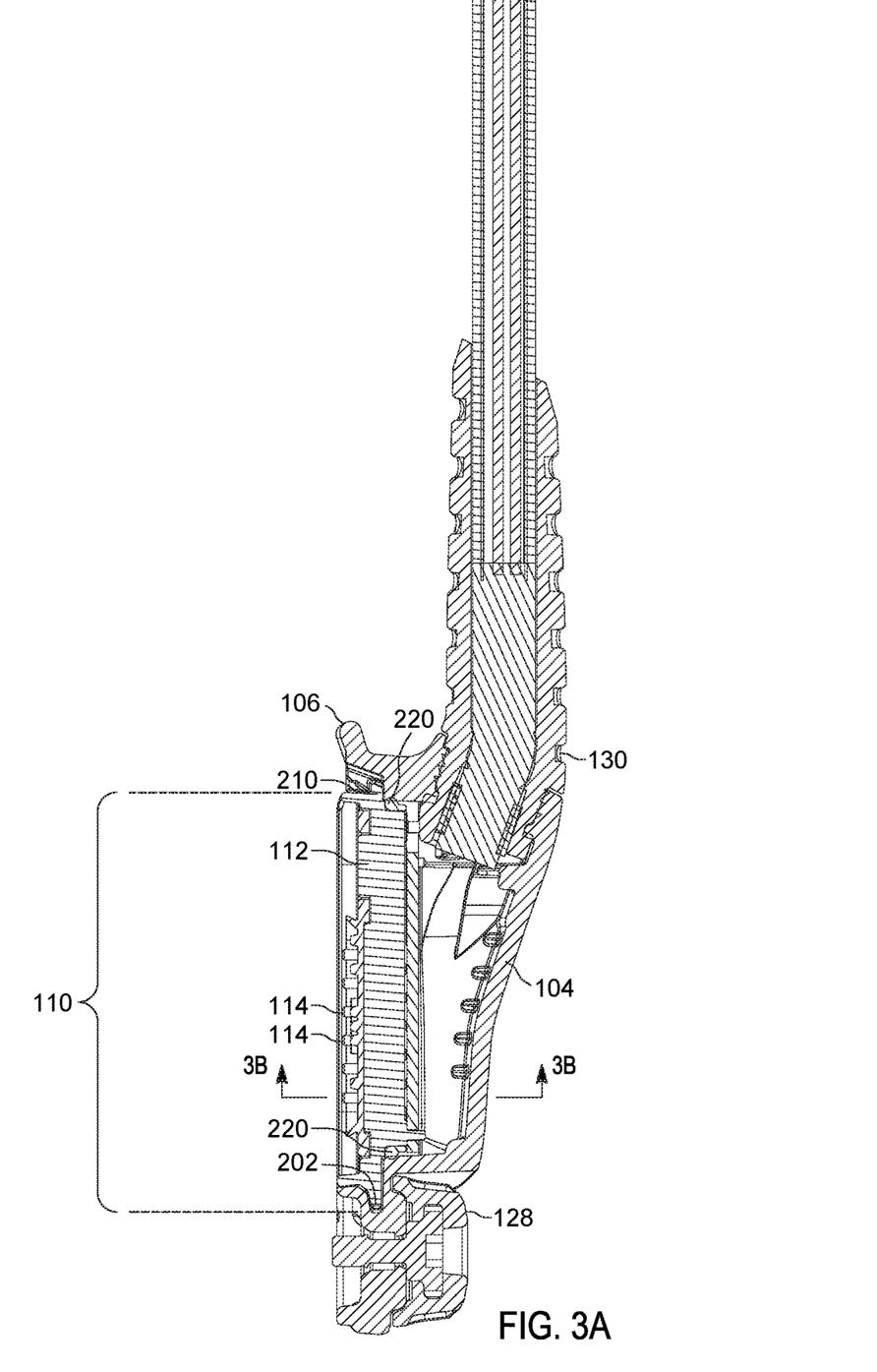
FIG. 3A is a side cross-sectional view of the accessory connector of the connector system of FIG. 1 in accordance with the various embodiments.
Figure 3B:
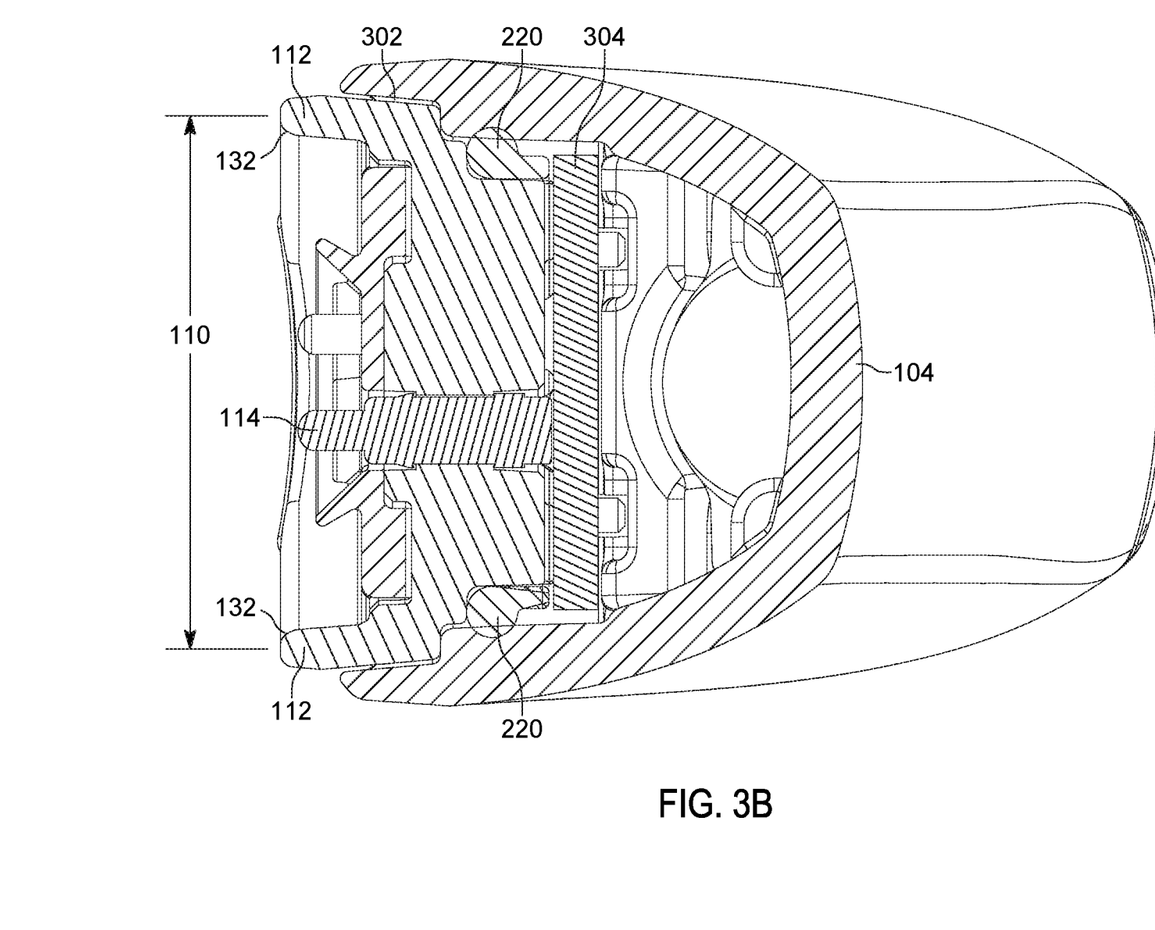
FIG. 3B is a partial cross-sectional view of the accessory connector in accordance with the various embodiments.

FIG. 3A is a side cross-sectional view of the accessory connector 102 in accordance with the various embodiments. FIG. 3B is a side view of the accessory connector in accordance with the various embodiments. FIG. 3A shows the first and second tabs 202, 210 extending from the perimeter alignment wall 112 of floating header 110 inserted within their respective retention features 204, 212 of the connector housing 104. FIGS. 3A and 3B show the pogo pins 114 recessed within the perimeter alignment wall 112 of the floating header 110. Recessing the pogo pins below the perimeter alignment wall 112 protects the pogo pins from damage when the accessory connector 102 is not attached to the portable radio.

FIG. 3A also shows the perimeter o-ring seal 220 coupled around the floating header 110 enabling the header to float with x-y compliance and protect against water intrusion even when the accessory connector 102 is not attached the connector interface of the portable radio of FIG. 1.

FIG. 3B is an enlarged cross-sectional view of the connector of FIG. 3A in accordance with the various embodiments. The floating header 110 is located within the connector housing 104. The perimeter alignment wall 112 extends beyond the edges of the connector housing 104. This view shows the pogo pins 114 being well protected by the perimeter alignment wall 112. A gap 302 (approximately 0.2 mm x-y gaps) is purposely formed between housing 104 and floating header 110. The chamfered edge 132 is shown formed along the interior base of the perimeter alignment wall 112. Chamfered edge 132 operates as a lead-in chamfer to provide full alignment of the accessory connector 102 to the connector interface of the portable radio prior to deflection of pogo pins 114 as they mate with the radio contacts.

Figure 3C:
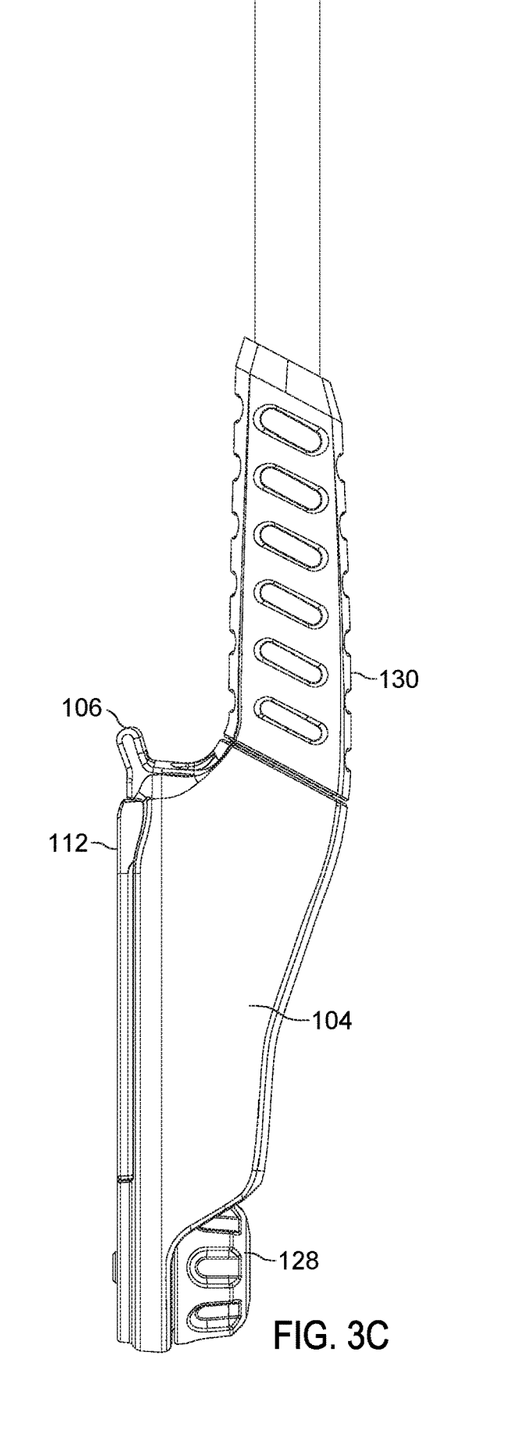
FIG. 3C is a side view of the accessory connector in accordance with the various embodiments.
Figure 4:
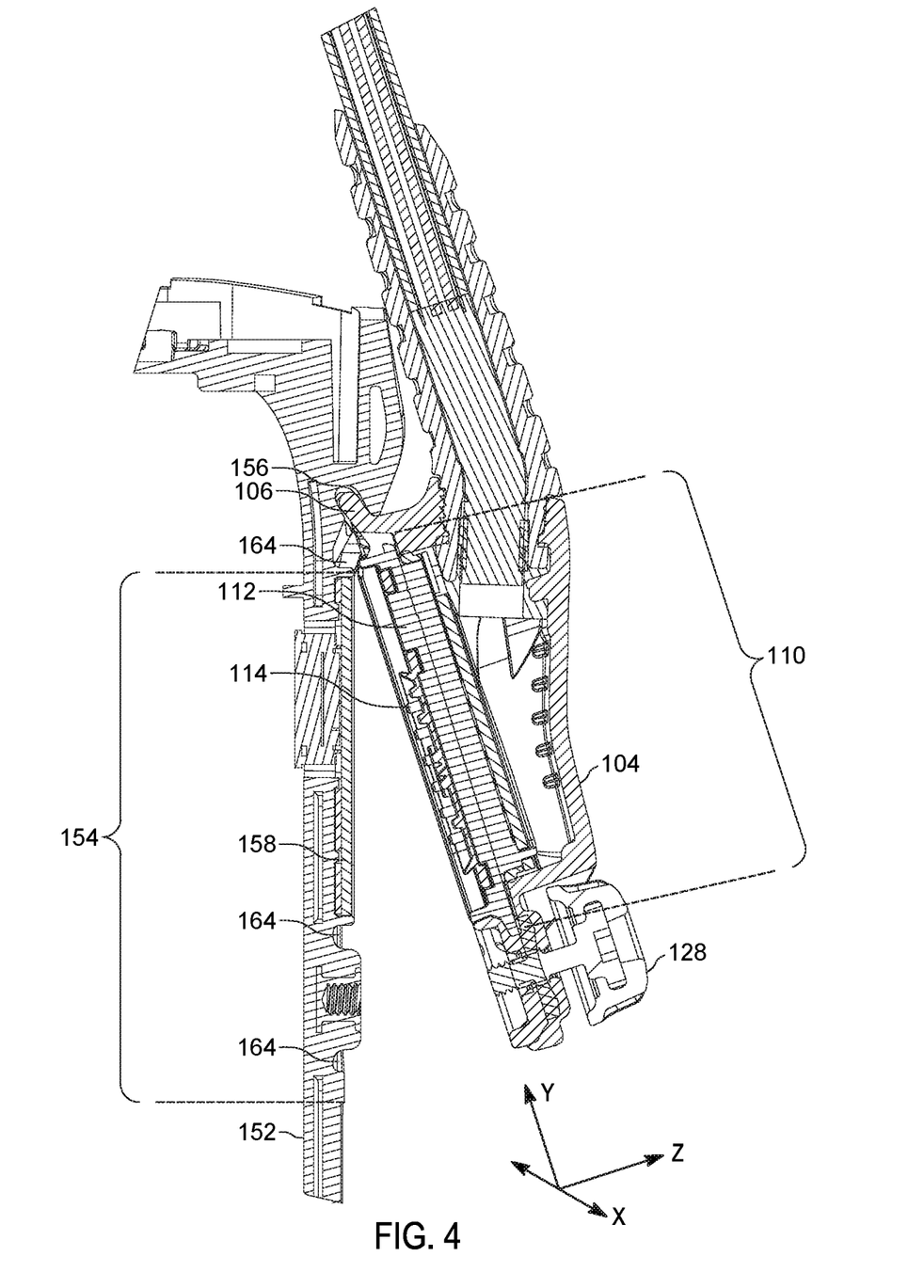
FIG. 4 is a side cross-sectional view of the accessory connector being partially engaged/disengaged to the connector interface of the portable radio of FIG. 1 in accordance with the various embodiments.

FIG. 3C is a side view of the accessory connector in accordance with the various embodiments. Connector housing 104 has edge tongue portion 106 extending therefrom. Strain relief 130 is coupled to the upper end of the connector housing 104. Thumb screw 128 is coupled to the lower end of connector housing 104. As seen in this view, the pogo pins are entirely protected by the floating header's perimeter alignment wall 112, the wall extending from the connector housing 104, FIG. 4 is a side cross-sectional view of the accessory connector 102 being partially engaged (or disengaged) to the connector interface of the portable radio of FIG. 1 in accordance with the various embodiments. From an engagement perspective, the edge tongue portion 106 of accessory connector 102 is inserted into the slot 156 geometrically configured within radio connector interface 154 for pivotally rotating the accessory connector 102 towards the connector interface 154 of the radio housing. The floating header 110 having pogo pins 114 within perimeter alignment wall 112 of the accessory connector 102 approaches the pedestal feature 158 within recess 164 of the connector interface 154 of radio housing 152 thereby mating with corresponding radio contacts 160 disposed upon the pedestal feature. The floating header 110 has moveability in the x-y planar directions to facilitate fine alignment of the pins and contacts as accessory connector 102 approaches the radio connector interface 154 in the non-planar, z direction.

Figure 5:
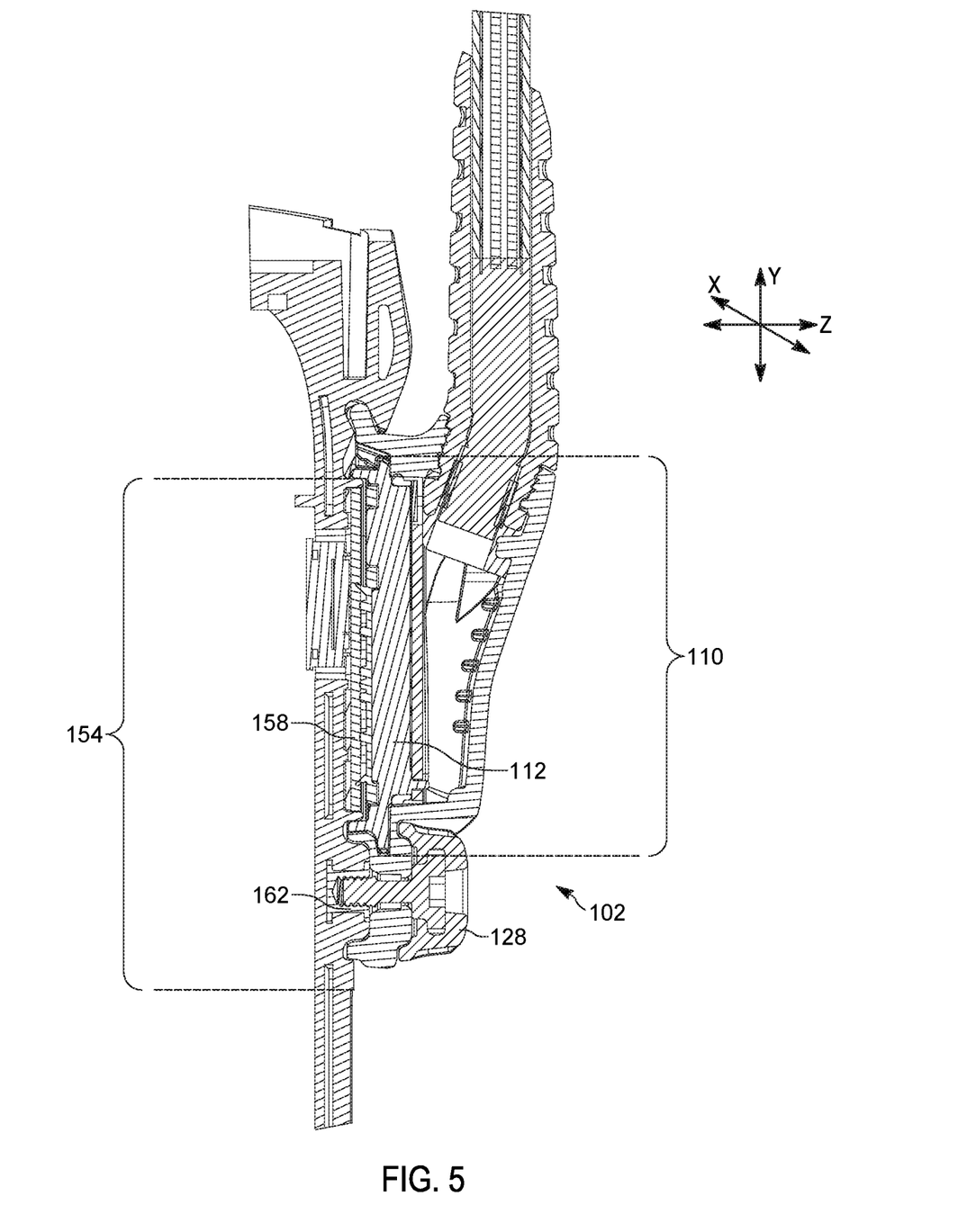
FIG. 5 is a side cross-sectional view of the accessory connector fully attached to the connector interface of the portable radio in accordance with the various embodiments.

FIG. 5 is a side cross-sectional view of the accessory connector 102 fully attached to the connector interface 154 of portable radio 150 in accordance with the various embodiments. The floating header 110 formed of the perimeter alignment wall 112 surrounding pogo pins 114 encases the pedestal feature 158 mating the pogo pins with the radio connector interface contacts with the fine alignment moveability in the x-y planar directions. During securement of the thumb screw 128, the thumb screw 128 loads the screw mount recess 108 of the accessory connector 102 against the threaded receptacle 162 on the radio side in the z direction. The recess 164 of the radio housing 152 advantageously provides an area against which to load the accessory connector 102 as the thumb screw 128 is tightened into the threaded receptacle 162, thereby aligning the accessory connector in the z-direction. The moveability of the floating header 110 in x-y planar directions relative to z-engagement features (edge tongue portion 106 and screw mount recess 108) facilitates fine alignment between the pins and contacts, as the thumb screw 128 is being tightened.

Figure 6:
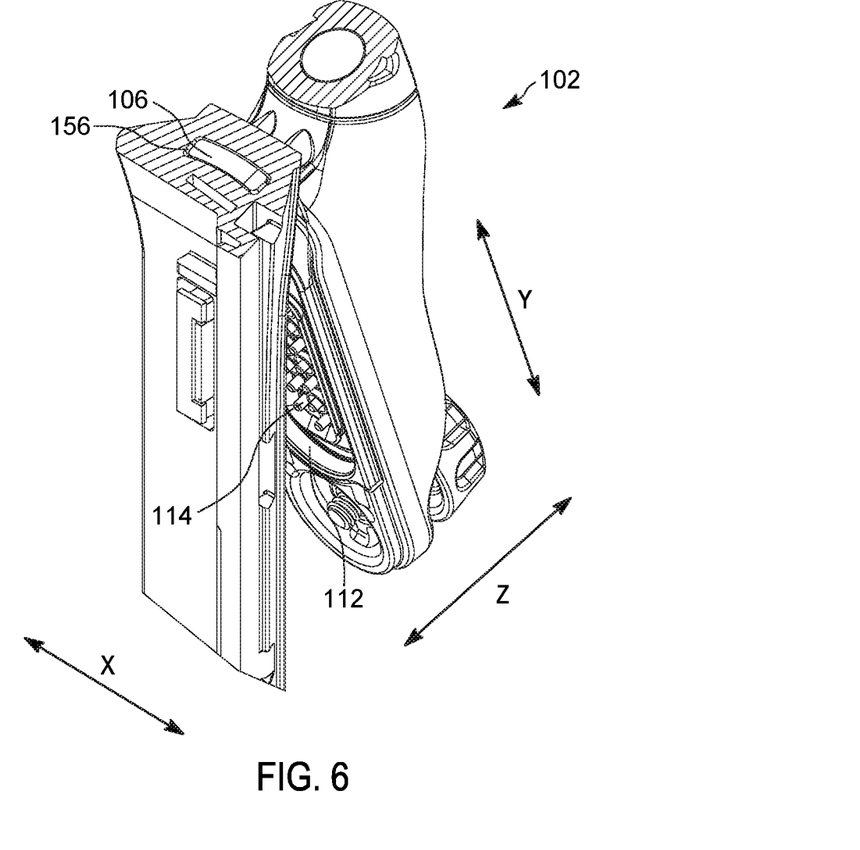
FIG. 6 is an isometric view of accessory connector engagement/disengagement to the connector interface of the portable radio in accordance with the various embodiments.

FIG. 6 is an isometric view of connector engagement (or disengagement) to the connector interface of the portable radio in accordance with the various embodiments. This view shows the edge tongue portion 106 being pivoted within the geometrically configured slot 156. As seen in this view, the slot 156 has been geometrically configured as a curved c-shaped slot which is well suited for receiving the edge tongue portion 106 and enabling pivoting action. The c-shaped tongue geometry (without needing additional ribs) also provides appropriate stiffness for achieving high pull out forces after the accessory is attached. The floating header's pogo pins 114 are well protected within the perimeter alignment wall 112 which will couple to the pedestal feature 158 (seen in other views) enabling the pogo pins and contacts to mate in the z-direction with fine alignment in planar x-y directions.

Figure 7:
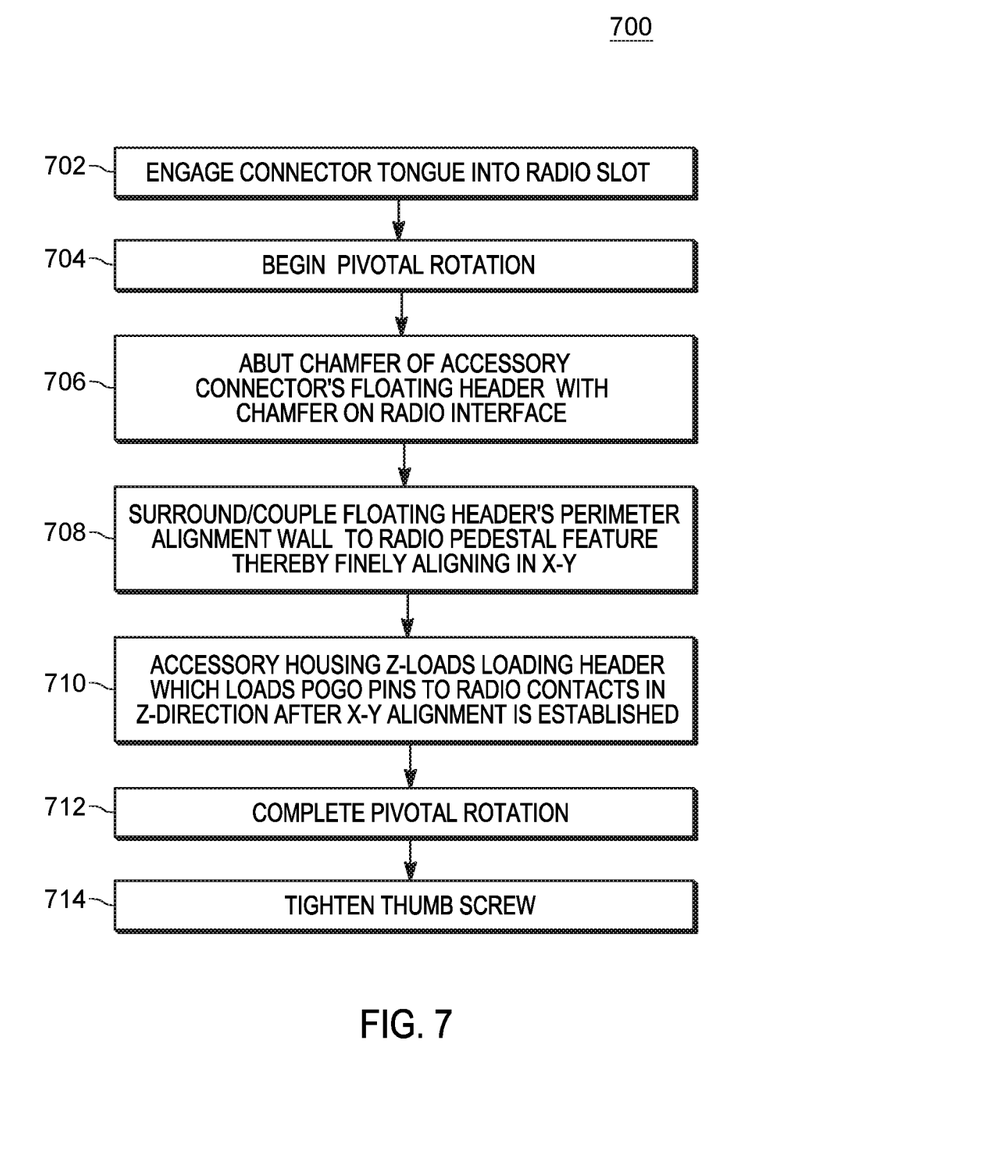
FIG. 7 is a method outlining an order of engagement of the accessory connector to the connector interface of the portable radio from the previous figures of the various embodiments.

In accordance with the embodiments, FIG. 7 provides a method outlining the order of engagement 700 of the accessory connector 102 to the connector interface 154 of portable radio 150 from the previous figures. The method starts at 702 by engaging the edge tongue portion (106) of the accessory connector (102) into the radio slot (156), and beginning pivotal rotation at 704, during which the header chamfer (132) of the floating header 110 of the accessory connector (102) abuts with the radio interface chamfer (166) on the radio connector interface (154) at 706. The floating header's perimeter alignment wall (112) then surrounds/couples to the radio pedestal feature (158) thereby finely aligning in x-y planar directions at 708. After the x-y alignment has been established, the connector housing (104) then z-loads the floating header (110) thereby loading the pogo pins (114) to the radio contacts (160) in a z-direction at 710. Pivotal rotation is completed at 712, and the thumb screw (128) is tightened at 714.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A connector system, comprising:
   an accessory connector for a portable radio;
   the accessory connector comprising:
   a connector housing having engagement features formed of an edge tongue portion extending from a first end and a screw mount recess extending from a second end;
   a floating header located between the edge tongue portion and the screw mount recess, the floating header being formed of a perimeter alignment wall surrounding a plurality of pogo pins, the floating header being movable in planar x-y directions between the engagement features, the perimeter alignment wall having an upper end located adjacent to the edge tongue portion and a lower end adjacent to the screw mount recess;

the portable radio comprising:
a radio housing having a connector interface, the connector interface comprising:
a slot geometrically configured for pivotally receiving the edge tongue portion of the connector housing;
a pedestal feature located adjacent to the slot, the pedestal feature comprising corresponding contacts to which the plurality of pogo pins of the floating header mate in a non-planar, z-direction in response to pivotal engagement of the edge tongue portion of the connector housing within the slot causing engagement of the perimeter alignment wall about the pedestal feature; and
the connector housing securing to the radio housing in the non-planar, z-direction at the second end of the connector housing.

2. The connector system of claim 1, wherein the floating header further comprises:
an o-ring surrounding the floating header to provide full perimeter sealing.

3. The connector system of claim 2, wherein the floating header is snap fit within an aperture of the connector housing.

4. The connector system of claim 2, wherein the floating header and the connector housing have a purposeful predetermined gap formed therebetween and within which the o-ring provides for planar x-y moveability of the floating header within the connector housing.

5. The connector system of claim 2, wherein the o-ring surrounding the floating header further provides protection against water intrusion into the accessory connector, when the accessory connector is not attached to the radio.

6. The connector system of claim 1, wherein the radio housing comprises a recess around the connector interface, the recess providing an area against which to load the accessory connector.

7. The connector system of claim 1, wherein the floating header further comprises:
a lip seal surrounding the pogo pins, the lip seal being formed as part of a seal membrane located on a face of the floating header, and wherein the seal membrane with lip seal provides sealing to the portable radio when the accessory connector is attached to the radio.

8. The connector system of claim 1, wherein the floating header further comprises:
a chamfered edge formed along an interior base of the perimeter alignment wall, the chamfered edge providing lead-in to locate and align the perimeter alignment wall to a corresponding radio interface chamfer formed on the pedestal feature of the portable radio.

9. The connector system of claim 8, wherein the chamfered edge of the floating header has a depth that provides full x-y alignment of the pogo pins prior to the pogo pins loading against the corresponding contacts.

10. The connector system of claim 1, wherein the edge tongue portion is formed of as a c-shape geometry insertable into the slot of the connector interface of the portable radio, the slot being geometrically configured as a corresponding c-shaped slot.

11. The connector system of claim 1, wherein the pogo pins are recessed within the perimeter alignment wall of the floating header, thereby protecting the pogo pins when the accessory connector is not attached.

12. The connector system of claim 1, wherein the a connector housing having engagement features formed of the edge tongue portion and screw mount recess is formed as a single plastic piece part.

13. The connector system of claim 1, wherein engagement of the accessory connector to the portable radio comprises:
engaging the edge tongue portion of the accessory connector into the slot of the connector interface of the portable radio;
pivotally rotating the accessory connector towards the connector interface, thereby abutting the chamfered edge of the floating header with a corresponding radio interface chamfer formed on the pedestal feature of the portable radio;
coupling and surrounding the perimeter alignment wall of the floating header to the pedestal feature of the portable radio, thereby establishing fine x-y alignment of the floating header to the connector interface of the portable radio;
after the fine x-y alignment has been established, z-loading the floating header of the accessory connector thereby loading the pogo pins to the corresponding contacts of the portable radio in a z-direction;
complete pivotal rotation; and
tightening of a thumb screw to the screw mount recess.

14. A connector, comprising:
a connector housing having engagement features formed of an edge tongue portion extending from a first end and a screw mount recess extending from a second end; and
a floating header located between the edge tongue portion and the screw mount recess; the floating header being formed of a perimeter alignment wall surrounding a plurality of pogo pins, the perimeter alignment wall having an upper end located adjacent to the edge tongue portion and a lower end adjacent to the screw mount recess; the floating header being movable in planar directions between the engagement features.

15. The connector of claim 14, wherein the floating header further comprises:
an o-ring surrounding the floating header.

16. The connector of claim 15, wherein the floating header and the connector housing have a purposeful predetermined gap formed therebetween and within which the o-ring is situated to provide planar moveability and perimeter sealing of the floating header within the connector housing.

17. The connector claim 14, wherein the floating header further comprises:
a chamfered edge formed along an interior base of the perimeter alignment wall, the chamfered edge providing lead-in for forward loading the connector to a radio interface.

* * * * *